United States Patent
Goto

[11] 3,723,788
[45] Mar. 27, 1973

[54] SPARK CHAMBER APPARATUS FOR DETECTING RADIATIONS

[75] Inventor: Eizo Goto, Chigasaki, Japan

[73] Assignee: Tokyo Shibaura Electric Co., Ltd., Kawasaki-shi, Japan

[22] Filed: Sept. 15, 1970

[21] Appl. No.: 72,435

[52] U.S. Cl................313/93, 250/83.6 R, 313/112, 313/220
[51] Int. Cl..............................................H01j 39/26
[58] Field of Search....313/93, 112, 220; 250/83.6 R, 250/213

[56] References Cited

UNITED STATES PATENTS

| | | |
|---|---|---|
| 2,953,702 | 9/1960 | Zieler........................................313/93 |
| 3,076,895 | 2/1963 | Baldwin...............................250/83.1 |
| 3,337,733 | 8/1967 | Charpak et al. .................250/83.6 R |

*Primary Examiner*—John Kominski
*Assistant Examiner*—Palmer C. Demeo
*Attorney*—Kemon, Palmer & Estabrook

[57] ABSTRACT

A spark chamber apparatus for detecting radiations which essentially comprises a directly sealed spark chamber enclosing an electric sparking gas at normal pressure and thin electrode layers covered over the boundary zone thereof with non-electroconductive glaze.

The sealing of spark chamber by the use of glazy substance and the covering of the perimetric portions of electrodes are simultaneously performed by a dipping process.

6 Claims, 10 Drawing Figures

INVENTOR.
EIZO GOTO

INVENTOR.
EIZO GOTO

SPARK CHAMBER APPARATUS FOR DETECTING RADIATIONS

This invention relates to a spark chamber apparatus for detecting radiations, and more particularly to a sealed spark chamber enclosing therein an electric sparking gas.

An apparatus called spark chamber was recently developed for detecting radiations. This apparatus is now utilized mainly for detecting or observing cancers at every part of human body. To explain in some detail, when a medical radioactive isotope is taken by a cancer patient or injected in him, it is accumulated in the cancer cells of very active metabolism. When a spark chamber is then applied to the affected part of the patient, spark discharge takes place in the chamber owing to the radiations from said medical radioactive isotope. By observing this spark illumination from the outside of the chamber or by photographing it, the presence or developing state of cancer within human body may be exactly known.

The spark chamber may be applied not only to the aforementioned observation of cancer but also to an inspection of cavities of cast or welded metals, a detection of charged particle track in cosmic rays, or monitoring of cooling water used in a nuclear reactor or polluted water from a radioactive isotope treating chamber.

Hitherto known spark chambers are so arranged that transparent electroconductive film is coated on each one face of two glass plates to form electrodes, said two electrode plates being oppositely held with the aid of several-milimeter-high electrically resistive frame placed between them so as to dispose the two electrodes in parallel, and an electric sparking gas is caused to flow in the chamber surrounded by the glass plates and the frame. When radiations from radioactive isotope are to be detected by this spark chamber, the spark chamber is contacted with an object to be inspected and voltage of several thousand volts is then impressed between said electrodes while sparking gas such as helium or neon is flowing in the chamber. Since a multitude of small illuminating pillars of spark are generated in the chamber by the radiations transmitted through the glass plate, the location and density of the radiations may be detected by observing or photographing the illumination from the outside of the glass plates of the spark chamber.

The above-mentioned apparatus, when used, requires the sparking gas to flow or circulate in the spark chamber consuming a large amount thereof and a complicated appurtenances such as gas bomb or circulator, and furthermore, the operation of the apparatus is very troublesome. What is more, as it is difficult to keep constant the gas pressure inside the chamber, and the sparking tends to be disturbed due to the gas pressure fluctuation and flow in the chamber, the exact detection of the radiations is ready to be prevented. These shortcomings make the use of the apparatus still impracticable.

One type of the apparatus has been tentatively manufactured in which the chamber having a peeping glass window is placed in a large sealed casing for the purpose of maintaining a constant gas pressure, and the sparkings gas does not flow in the chamber but is enclosed in the chamber. In this type of apparatus, however, the casing becomes large size, and a photographing film can not be contacted directly with the glass plate of the spark chamber, thus making it inconvenient to photograph the spark. This type of apparatus is also still impracticable.

Further, in such usual spark chambers, spark tends to occur in the perimetric portion of the electrodes, preventing the exact measurement of the radiations.

An object of the present invention is to provide a simple spark chamber of enclosed type capable of directly photographing the spark.

Another object of this invention is to provide a spark chamber of enclosed type not causing abnormal spark in the perimetric portion of the electrodes.

The other object of this invention is to provide a method for precisely fabricating above improved spark chambers in a simplified process.

These objects may be attained in accordance with this invention by constructing the apparatus with the following parts: two glass plates each coated over the interior area of one face thereof with a thin layer of electroconductive transparent substance to form an electrode; non-electroconductive covering glaze fused along the boundary zone between said electrode layer and the glass plate; a glazy frame fused to the perimeter of said two glass plates disposed in parallel and facing each other at a distance of several millimeters to form a sparking chamber; an electric sparking gas enclosed in the sparking chamber; and electric conductors connected to the electrodes.

Other important objects and advantageous features of the invention will be apparent from the following description and accompanying drawings wherein, for the present purpose of illustration only, specific embodiments of the invention are set forth in detail.

Figure 1:
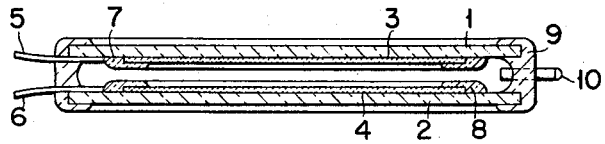
FIG. 1 is a vertical cross-sectional view of a spark chamber of basic type according to the present invention.
Figure 2:
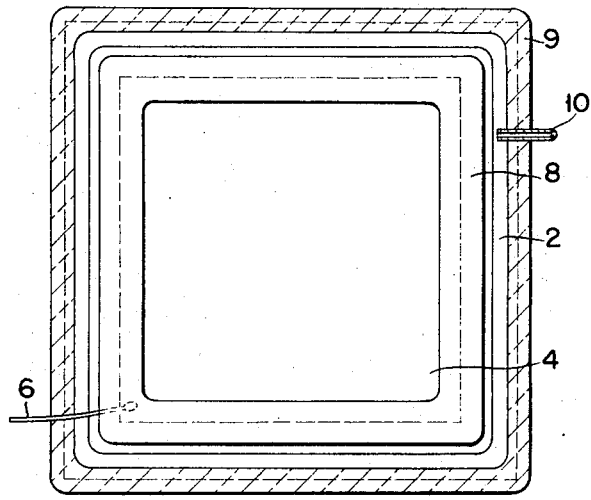
FIG. 2 is a horizontal cross-sectional view of the spark chamber of FIG. 1.

Referring to FIGS. 1 and 2, the construction of a spark chamber of basic type of this invention will be explained in the following.

Electroconductive transparent layers 3 and 4, such as thin film of melted tin oxide, are coated as electrodes over the interior area of each one face excluding the portions to be thereafter sealed, of two glass plates 1 and 2 of about 5 mm in thickness and about 300 mm × 300 mm in size. The thickness of the electrode is about 0.5 micron. Electric conductors 5 and 6 (Fe-Ni alloy band of 0.25 mm in thickness and 2 mm in width, for instance) are connected respectively to the electrodes 3 and 4 with a metal paste, and extend outside the glass plates 1 and 2. The perimeters of the electrodes 3 and 4 are covered with non-electroconductive glazes 7 and 8, while the glazes are also fused to the glass plates 1 and 2. The two glass plates 1 and 2 are disposed so accurately that the electrodes 3 and 4 face each other in parallel at a definite distance (2 mm, for instance), and a proper sealing material such as solder glass hermetically seals the perimeter of the glass plates under this state. An enclosed spark chamber is thus formed by the fused perimetric frame 9 and the two glass plates 1 and 2.

The fused perimetric frame 9 is provided with a gas introducing pipe 10 of small diameter, 2 mm in diameter and 0.05 mm in thickness for instance, communicating with the spark chamber. An injection needle (not shown) is inserted into the pipe 10, and electric sparking gas, such as mixed gas of helium and xenon, is blown into the chamber through the injection needle, thereby purging the air remaining in the chamber. Subsequently, the end of the pipe 10 is sealed with solder glass and the sparking gas in enclosed at approximately one atm at a normal temperature. If required, a quenching agent such as alcohol may be mixed with the sparking gas in several per cent by volume in order that the sparking light may be extinguished quickly when the transmission of radiations into the chamber ceases.

The spark chamber apparatus is used for detecting the radiations in a room at a constant room temperature (15°C, for instance). The apparatus is small in size, light in weight, and easy to handle. Since the sparking gas of a definite composition is enclosed hermetically and statically between the two electrodes held precisely at a definite distance, there is no apprehension that the spark gas may be disturbed. Further, as the perimetric portions of the electrodes 3 and 4 are covered with non-electroconductive glazes 7 and 8, they can prevent the occurrence of undesirable electrode-edge spark which tends to take place on the perimetric portion of the electrodes. For the reasons described above, the detection of radiations may be performed with high accuracy by the present apparatus. The electrode layer usually tends to separate from the glass plate, but the glazes 7 and 8 also serve to prevent such separation.

When the outside surface of one glass plate of the present spark chamber is applied to the affected part of a cancer patient who has taken a medical radioactive isotope such as $Au^{198}$ or $Co^{57}$, and then several thousand volts of D.C. electric pressure (from 1,000 to 2,000 volts, for example) is impressed between the two electrodes, sparks occur in the chamber owing to the radiations from the affected part and corresponding to the quantity of radiations. This sparking light is observed with the naked eye from the outside surface of the other glass plate, or photographed by placing photo-film on said surface to know exactly the state of cancer thereby. If required, the photo-film may be placed between the affected part and the chamber, because the film is not sensitive to the radiation.

Figure 3:
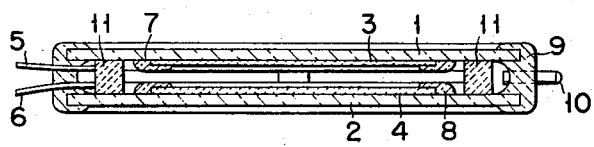
FIG. 3 is a vertical cross-sectional view of one embodiment of the spark chamber according to this invention.
Figure 4:
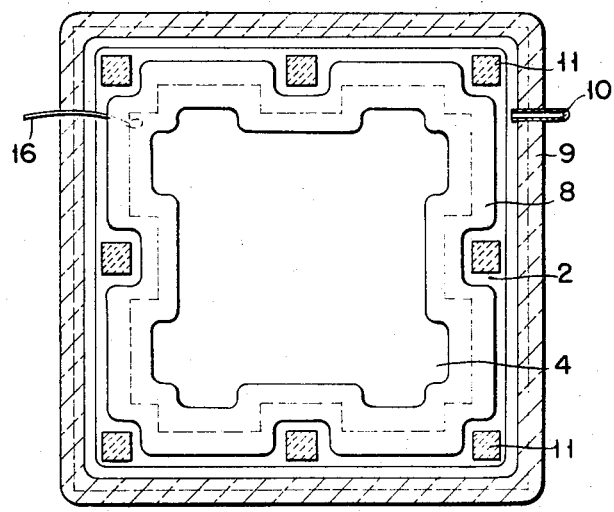
FIG. 4 is a horizontal cross-sectional view of the spark chamber of FIG. 3.

As illustrated in FIGS. 3 and 4 relating to one embodiment of this spark chamber, several small spacers 11 of glass plate or ceramics may be placed between the fused perimetric frame 9 and the non-electroconductive glazes 7 and 8, and thereby the fabrication of the spark chamber becomes much easier. The spacers are placed at an interior parts from the perimetric frame 9, because it keeps the spacers from damage due to the fusing heat of the frame.

The method for fabricating this spark chamber was created by the inventor of this invention, and the principal process will be explained with the aid of FIGS. 3 and 4 as follows. The electric conductors 5 and 6 and several spacers 11 are fixed at proper positions on the aforementioned two glass plates 1 and 2 each coated over the interior area of one face with thin electrode layers 3 and 4 respectively. A thick welding material of glaze having low melting point (softening point thereof being about 530°C) is then coated on the area extending from the perimetric portion of the electrode layer to the adjacent portion of the glass plate. Subsequently, these glass plates are assembled mechanically into one body so as to face each other by placing spacers between the glass plates, and then the assembly is dipped in a melted solder glass bath one side at a time in sequence; thereafter, the assembly is taken out from the bath.

By so doing the two glass plates are completely sealed at a definite distance by the cooled frame made of the solder glass, forming an enclosed spark chamber. Further, during dipping, the welding material on the boundary zone between the electrode layer and the glass plate is melted automatically by the heat transmitted from the melted solder glass bath, and the perimetric portions of the electrode layers 3 and 4 are thus covered with non-electroconductive glazes 7 and 8. If the chamber is sealed after the perimetric portions of electrode layers are covered with glazes, many measures would become troublesome in fabrication, and further there would be introduced much dangers of strain and distortion in the electrode or the glass plate. However, in the case of the method of this invention, the glaze covering and the chamber sealing may be conducted at the same time without the occurrence of said strain and distortion.

The gas introducing pipe 10 is fixed at the time of said dip sealing. In this case, the pipe hole is closed by the melted glass, but the closed pipe can be opened by inserting into the pipe a copper wire of about 1 mm in diameter heated at a temperature of from 700° to 800°C.

The fixing of the electrode layer to the glass plate is performed by a usual method of vacuum evaporation or chemical plating. If transparency is not necessary to the electrode layer, it is a metallic foil as the electrode layer.

Figure 5:
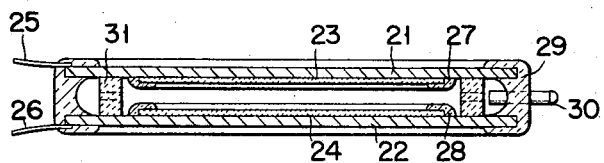
FIG. 5 is a vertical cross-section of another embodiment of the spark chamber according to this invention.
Figure 6:
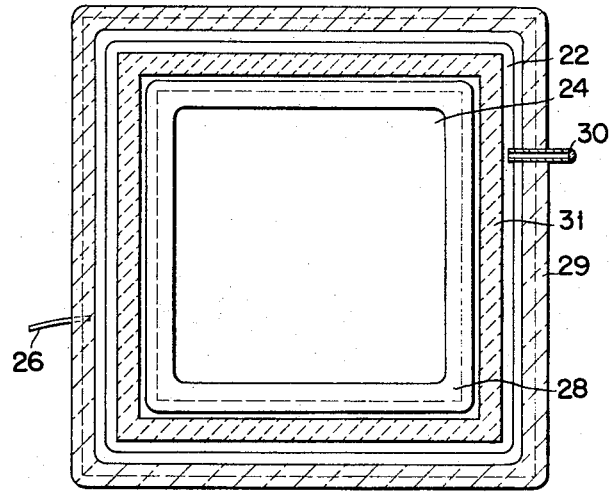
FIG. 6 is a horizontal cross-sectional view of the spark chamber of FIG. 5.

The other specific embodiment of this invention, in which the two glass plates in the spark chamber are replaced by two metal plates, will be explained with the aid of FIGS. 5 and 6.

Electroplated double metal layers of copper and nickel 23 and 24 are fixed over the interior area of two Fe-Ni alloy plates 21 and 22 (Fe 50%, Ni 50%) of 1.2 in thickness and 90 mm × 90 mm in size. The perimetric portion of the layers are covered with non-electroconductive glazes 27 and 28 as described before. The metal plates 21 and 22 are connected respectively with electric conductors 25 and 26. In this embodiment, a square spacing frame 31 made of ceramics is used instead of several pieces of spacer 11, shown in FIGS. 3 and 4, and the two metal plates 21 and 22 are sealed, as described before, by a fused perimetric frame 29 while interposing said square frame 31 between the two metal plates. The spark chamber is provided with a gas introducing pipe 30 as in FIGS. 3 and 4. Although not shown in the figures, it is recommended to cover the outer surface with non-electroconducting paint.

In the case of this spark chamber, spark light can not be observed or photographed since the electrodes are not transparent. However, the amount of radiations may be known by introducing into a counter the electric spark current in this chamber; accordingly, this apparatus may be useful for detecting the flaws in materials and products or for other purposes.

As another embodiment of the present invention, a multistage spark chamber apparatus shown in FIG. 7 will be explained in the following.

Generally speaking, a spark chamber apparatus suitable for detecting strong or weak radiations is obtained by properly selecting the composition of the sparking gas enclosed in the spark chamber, the distance between the electrodes, and the voltage to be impressed. In case that radiations of various strength are to be detected, a plurality of aforementioned apparatuses must be used in combination, and operation of the apparatuses is very troublesome. A device, which is so designed to clearly detect both strong and weak radiations by one apparatus, is the multistage spark chamber apparatus.

Figure 7:
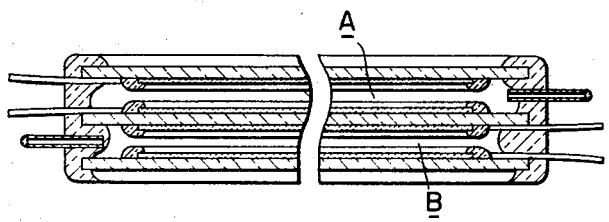
FIG. 7 is a vertical cross-sectional view of further another embodiment of the spark chamber according to this invention.

A double stage apparatus is illustrated in FIG. 7. Although the reference numerals are omitted in FIG. 7, it will be apparent that this apparatus is constructed by laying one spark chamber shown in FIG. 1 over another, having one intermediate glass plate in common. The apparatus has thus an upper enclosed chamber A and a lower enclosed chamber B.

When the upper chamber A, having 2 mm distance between the electrodes and containing a mixed spark gas of 98.2 percent helium and 1.8 percent of difluoromethane, is impressed with a voltage of 1,450 volts, highly illuminating and small spotty spark pillars are generated in this spark chamber by the radiations stronger than 10 microcuries, making photographing possible; however, the spark chamber can not detect the radiations weaker than 10 microcuries. When the lower chamber B, having 2 mm distance and containing a mixed gas of 99.1 percent helium and 0.9 percent difluoromonochloromethane, is impressed with a voltage of 1,000 volts, this spark chamber generates sparks by the radiations weaker than 10 microcuries, and it is possible to catch the radiations by introducing the electric spark current into a counter; however, the sparks are too dim and too weak in illumination to photographing. Therefor, the double stage apparatus is capable of detecting both strong and weak radiations simultaneously by one apparatus of simple construction; the handling of the apparatus is easy and convenient, and the preparing cost of apparatus is low.

Further another embodiment of the present invention will be explained with the aid of FIGS. 8 and 9.

In the case of detecting the radiations having low energy, it is preferable to increase the efficiency of radiation entrance in the chamber through the glass plate by making as small as possible the thickness thereof. However, when the glass plate is too thin, its mechanical strength decreases, tending to distort or break. In the present embodiment, the sensitivity of the spark chamber could be elevated without loss of mechanical strength by providing with a great number of small holes regularly in the outside of the glass plate of normal or greater thickness. The glass portion retaining the initial thickness can serve as a collimator, intercepting the radiations entering obliquely and merely receiving the radiations entering perpendicularly, thereby making the equipment more compact.

Figure 8:
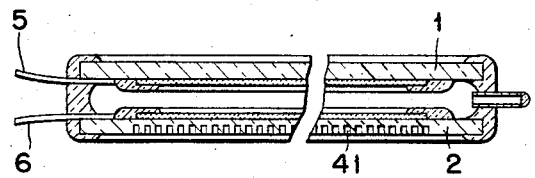
FIG. 8 is a vertical cross-sectional view of further another embodiment of the spark chamber according to this invention.
Figure 9:
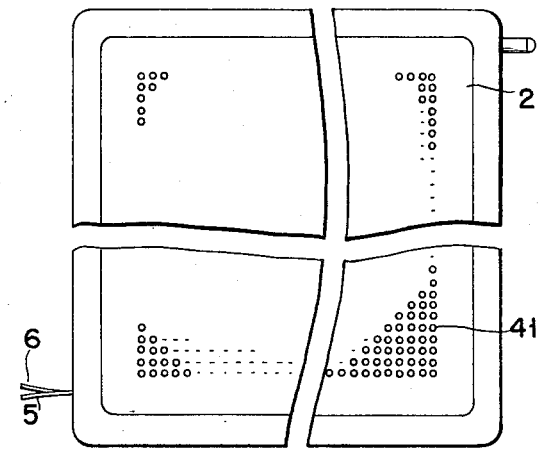
FIG. 9 is a bottom view of the spark chamber of FIG. 8.

In FIGS. 8 and 9, it is seen that hollow holes 41 of 3 mm in diameter and 7 mm in depth are provided regularly at a distance of 2 mm in the outside of the glass plate 2 (8 mm in thickness) of a spark chamber shown in FIG. 1. When the radiations pass into the spark chamber through the glass plate 2, it scarcely loses their strength since the thickness of the glass plate is only 1 mm from the bottom of the hollow hole 41.

The spark chamber of this embodiment provides a clear photograph even when $Ce^{144}$ (140 Kev) and $Co^{57}$ (120 Kev), low in the radiation energy, are employed instead of $I^{31}$ (360 Kev) and $Au^{198}$ (410 Kev) which are usually used. The glass plate 2 is 8 mm thick except the hole portions and has still sufficient mechanical strength, causing no distortion or break.

The hollow holes 41 may be provided in the both glass plates 1 and 2.

Still another embodiment of the present invention will be explained in the following with the aid of FIG. 10.

The spark chamber of ordinary size 300 mm × 300 mm, for instance, shown in FIGS. 8 and 9 retains its mechanical strength even if the glass plate is provided with numerous hollow holes as described before. In the case of large-size chambers as large as several square meters, for example, the presence of such holes decreases the mechanical strength of the glass plate, causing distortion or break.

Figure 10:
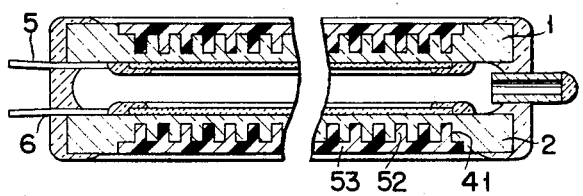
FIG. 10 is a vertical cross-sectional view of further another embodiment of the spark chamber according to this invention.

In the present embodiment, numerous hollow holes (3 mm in diameter and 4.5 mm in depth) like those shown in FIG. 8 are drilled, as shown in FIG. 10, in the glass plates 1 and 2 (500 mm × 500 mm × 5 mm in dimension) of a large-size spark chamber shown in FIG. 1, and those holes are filled with a synthetic resin 52 such as polyvinylbutyral. For the convenience of fabrication, 0.3 mm thick layers 53 of the same synthetic resin are formed outside the glass plates, connecting the resin filled in the holes.

Synthetic resin is generally superior to glass in the transmission of radiations. It is desirable to use resin plate in place of glass plate; however, the use of glass plate is inevitable, because resin plate can not form a sealed chamber.

When the holes are filled with resin material as described above, the glass plate is thereby reinforced. Consequently, the glass plates of large-size spark chambers neither distort nor break, and the measurement is made accurately.

The construction of the spark chamber according to the present invention has been explained above with respect to various embodiments. Glass plate having flat plane surfaces is employed in all of the aforementioned spark chambers, but the glass plate is not restricted to the flat plane glass plate, but glass plates of cylindrical or semispherical form, for instance, may be combined to fabricate a spark chamber, as for as two plates are perfectly parallel. Spark chambers having curved surfaces are convenient to use for inspecting human heads or shaft-form materials.

What is claimed is:

1. A spark chamber apparatus for detecting radiations comprising two glass plates each coated over the interior area of one face thereof with a thin layer of electroconducting transparent substance to form an electrode, a non-electroconductive covering glaze fused along the boundary zone between said electrode layer and the glass plate, a glazy frame fused to the perimeters of said two glass plates disposed in parallel facing each other at a distance of several millimeters to form a sparking chamber, a sparking gas enclosed at normal pressure in said spark chamber, and electric D.C. conductors connected to said electrode layers.

2. A spark chamber apparatus for detecting radiations which has multistage spark chambers consisting of a plurality of spark chambers as defined in claim 1, laying one chamber over another so as to have an intermediate glass plate in common.

3. A spark chamber apparatus for detecting radiations as defined in claim 1 wherein at least one of the glass plates has a number of small hollow holes provided regularly in the outside of the glass plate.

4. A spark chamber apparatus for detecting radiations as defined in claim 3 wherein the small hollow holes provided in the outside of the glass plate are filled up with synthetic resin.

5. A spark chamber apparatus for detecting radiations comprising two glass plates each coated over the interior area of one face thereof with a thin layer of electroconductive transparent substance to form an electrode, a non-conductive covering glaze fused along the boundary zone between said electrode layer and the glass plate, a glazy frame fused to the perimeters of said two glass plates set apart in parallel facing each other at a distance of several millimeters by several pieces of non-electroconductive spacers interposed between said two glass plates to form a spark chamber, a sparking gas enclosed in the spark chamber at normal pressure, and D.C. conductors connected to said electrode layers.

6. A spark chamber apparatus for detecting radiations comprising two metal plates each coated over the interior area of one face thereof with a thin electroplated layer to form an electrode, a non-electroconductive covering glaze fused along the boundary zone between said electrode layer and the metal plate, a glazy frame fused to the perimeter of said two metal plates set apart in parallel facing each other at a distance of several millimeters by a non-electroconductive spacing frame interposed between said two metal plates, a sparking gas enclosed at normal pressure in the spark chamber, and electric D.C. conductors connected to said electrode layers.

* * * * *